Patented Feb. 20, 1940

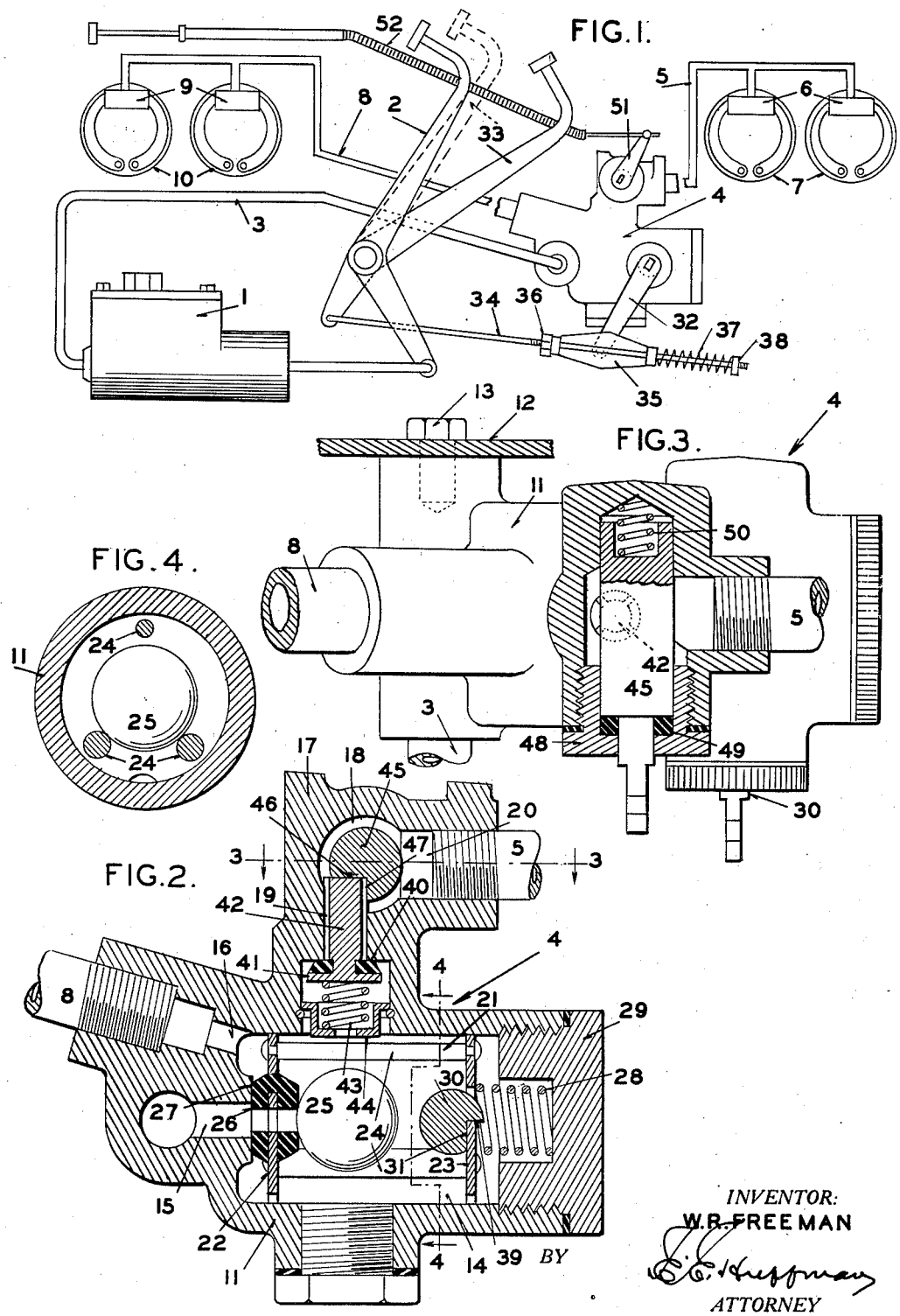

2,190,981

UNITED STATES PATENT OFFICE 2,190,981

FLUID BRAKING SYSTEM

Walter R. Freeman, University City, Mo., assignor to Wagner Electric Corporation, St. Louis, Mo., a corporation of Delaware Application September 24, 1938, Serial No. 231,513

7 Claims. (Cl. 188—152)

My invention relates to fluid braking systems and more particularly to control means therefor.

One of the objects of my invention is to provide a control mechanism for fluid pressure-actuated brakes that will permit the operator to hold the brakes applied under certain conditions and also permit the operator to prevent certain of the brakes from being applied.

Another object of my invention is to combine in a single unit a valve mechanism for preventing certain brakes of a fluid-actuated braking system from being applied when desired and other valve mechanism for preventing, under certain conditions, the brakes when applied from being released.

Other objects of my invention will become apparent from the following description taken in connection with the accompanying drawing in which Figure 1 is a schematic view of a fluid-actuated braking system showing my invention associated therewith and the manner in which the structure embodying the same is controlled; Figure 2 is a longitudinal cross-sectional view showing the manner in which the valve mechanisms are combined; Figure 3 is a view, partly in section, taken on the line 3—3 of Figure 2; and Figure 4 is a cross-sectional view taken on the line 4—4 of Figure 2.

Referring to the drawing, numeral I indicates a master cylinder device for a fluid braking system, the piston (not shown) of which is actuated by a brake pedal 2. The master cylinder is connected to a conduit 3 which communicates through my novel control device 4 with the conduit 5 leading to the fluid motors 6 of the front brakes 7 and also with conduit 8 leading to the fluid motors 9 of the rear brakes 10.

The control device 4 is enclosed within a single casting 11 which is secured to a convenient support 12 by means of a bolt 13. The casting is formed with a cylindrical chamber 14 which communicates by means of a passage 15 with conduit 3 leading from the master cylinder. This chamber also communicates with conduit 8 leading to the rear brakes by means of the passage 16. The main portion of casting 11 has an extension 17 above chamber 14 provided with a cross-bore 18 communicating with chamber 14 by a passage 19 and with conduit 5 leading to the front brakes by a passage 20.

Within chamber 14 is positioned a cage 21 comprising two end plates 22 and 23 connected together by three rods 24, the lower two of which are adapted to form a track for a ball 25 (see Figure 4). The end plate 22 of the cage carries an annular rubber valve element 26 which cooperates with the flat surface 27 surrounding the end of passage 15. This annular valve element also cooperates with the ball 25 and when the annular valve element is in engagement with the flat surface and the ball is in engagement with the annular valve element, fluid will be prevented from flowing from chamber 14 to the master cylinder device through conduit 3. Fluid under pressure, however, will be free to be forced from the master cylinder into chamber 14 by the unseating of ball 25. A spring 28 is interposed between the end plate 23 and a closure plug 29 and normally biases the cage to a position where the annular valve element will be in engagement with the flat surface 27.

A control shaft 30 extends into chamber 14 and is provided with a cam surface 31 for cooperation with the end plate 23 whereby the cage may be moved to the right against the spring 28 when the shaft is rotated in a counter-clockwise direction as seen in Figure 2. This movement of the cage will cause the annular valve element 26 to become disengaged from the flat surface 27 and thus permit free communication in both directions between the chamber and the master cylinder device notwithstanding the ball may be in engagement with the annular valve element. The outer end of the shaft 30 has secured thereto an operating arm 32 which is connected to the clutch pedal 33 by a rod 34 and a sleeve 35 slidably mounted upon the rod. The sleeve is pivotally connected to arm 32 and is normally held in engagement with a shoulder 36 on rod 34 by means of a light spring 37 interposed between said sleeve and another shoulder 38 at the end of the rod. The construction is such as to permit the rod 34 to overrun arm 32 so that the clutch pedal, if desired, can be moved to a position beyond that necessary to move arm 32 to a position permitting the cage to assume the position shown in Figure 2. A shoulder 39 on shaft 30 cooperates with the end plate 23 to limit the clockwise rotation of the shaft.

The passage 19 between bore 18 and chamber 14 has associated therewith a valve seat 40 and cooperating with this seat is a valve element 41 having a fluted stem 42 guided in the passage 19 and projecting into bore 18. The valve element 41 is normally held seated by a very light spring 43 interposed between the valve and an abutment 44 positioned in the lower end of passage 19. The bore 18 in extension 17 receives a shaft 45 provided with a cam surface 46 for cooperation with the end of stem 42 whereby counterclockwise rotation of the shaft will cause the valve element 41 to be held off its seat 40. The shaft also has a shoulder 47 for engaging the side of the stem to limit the clockwise rotation of the shaft. The bore is closed by a plug 48 surrounding the end of the shaft and a packing 49 seals the shaft at the plug, this packing being placed under pressure by a spring 50 interposed between the end of the shaft and the closed end of the bore. The outer end of shaft 45 has secured thereto an arm 51 which is adapted to be controlled from a remote point, as for example, the operator's compartment of the vehicle, by a Bowden cable 52.

The casting 11 of the control device is preferably mounted on the support 12 in such a manner that the two lower rods 24 forming the track for ball 25 will be inclined with respect to the roadway upon which the vehicle sets, this inclination being downwardly toward the rear of the vehicle. The inclination is approximately two or three degrees, this being sufficient to cause the ball to engage the annular valve element when the vehicle is on a horizontal roadway.

In operation when the clutch pedal is in clutch-engaged position (dotted lines in Figure 1), the cage 21 will be moved to the right end of chamber 14 by means of cam 31 on shaft 30. Under these conditions the valve element 26 will be disengaged from the flat surface 27 and fluid under pressure is free to flow from the master cylinder to the fluid motors 9 of the rear brakes or from these fluid motors to the master cylinder. If the valve element 41 is held off its seat by cam 46 of shaft 45, fluid under pressure is also free to flow from the master cylinder to the fluid motors 6 of the front wheel brakes 7 or from these fluid motors to the master cylinder.

If the vehicle should be brought to a stop facing upwardly on an inclined roadway and the brakes are applied, they will be maintained applied by the disengagement of the clutch. When the clutch pedal assumes clutch-disengaged position, as shown in Figure 1, shaft 30 will assume the position shown in Figure 2 and the cage will be moved to the left under the action of spring 28, thus causing the valve element 26 to engage the flat surface 27. The ball 25 will now be in engagement with the annular valve element 26 and any fluid pressure which has been placed in the fluid motors 9 and 6 of the brakes will be maintained therein and the foot of the operator may be removed from the brake pedal without releasing the brakes. This permits the operator to use this foot for other purposes, as for example, operating the accelerator or the starter. If the brakes have not been applied and the clutch is disengaged, they may be applied and held so since fluid under pressure can pass from the master cylinder to the fluid motors by the unseating of ball 25. When the clutch is permitted to become re-engaged to start the vehicle, the rearward movement of the clutch pedal will cause shaft 30 to be rotated in a counter-clockwise direction and cam 31 will move the cage to the right, thus disengaging the valve element 26 from the flat surface 27 and permitting fluid to flow back to the master cylinder.

Under certain conditions it is desirable to completely disable the front wheel brakes, as for example, when driving on wet or icy pavements since it is easier to control the front wheels of the vehicle when there is no braking action being performed thereon. When these conditions arise, the operator of the vehicle can readily prevent the front wheel brakes from being operative by pushing on the Bowden cable and moving shaft 45 to the position shown in Figure 2. This permits the valve element 41 to be seated under the action of spring 43 and no fluid under pressure can flow from chamber 14 to fluid motor 6 of the front wheel brakes. In the event the front wheel brakes have already been applied prior to the closing of the valve element 41, these brakes are released at the same time that the rear brakes are released as the valve element 41 is readily unseated by the fluid pressure in the fluid motor 6 to thus permit the fluid under pressure from said motors to return to the master cylinder.

From the above description it is apparent that I have devised a very simple and compact control mechanism for fluid-operated brakes which is readily controllable by the vehicle operator so as to prevent the front wheel brakes from being operated when desired. The device also permits the operator to hold the brakes applied if and when they are applied without maintaining his foot upon the brake pedal and to release the brakes whenever the clutch is re-engaged to start the vehicle. If the front wheel brakes are prevented from being operated, the brake holding valve is still effective to prevent release of the rear wheel brakes whenever it is desired to prevent the vehicle from rolling backward on an inclined roadway without maintaining the operator's foot upon the brake pedal.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid braking system, the combination with a source of pressure and braking units connected to be actuated thereby, of a combined brake holding valve and a shut-off valve for the braking system and comprising a casing connected in the system and through which fluid must pass to and from the braking units, valve means within said casing for preventing return flow of fluid from both braking units, other valve means in the casing and positioned between the first named valve means and one of the brake units for preventing fluid from flowing to said brake unit but not in the opposite direction, and means for causing said last named valve means to be positively held open.

2. In a fluid braking system for a vehicle, the combination with a source of pressure and braking units for the front and braking units for the rear wheels connected to be actuated thereby, of a combined brake holding valve and a shut-off valve for the braking system and comprising a casing connected in the system and through which fluid must pass to and from the braking units, valve means within said casing for preventing return flow of fluid from all of the braking units, other valve means in the casing and positioned between the first named valve means and brake units of the front wheels for preventing fluid from flowing to said brake units but not in the opposite direction, and means for causing said last named valve means to be positively held open.

3. In a fluid braking system, the combination with a source of pressure and two braking units connected to be actuated thereby, of a combined brake holding valve and shut-off valve for the braking system and comprising a casing connected in the system and provided with a chamber through which fluid must pass to and from both braking units and a second chamber communicating with the first chamber and through which fluid must pass to and from one of the braking units, valve means in the first named chamber for preventing return flow of fluid from both braking units, a valve seat between the two chambers, a valve element associated with said seat and movable off its seat in the direction of flow of fluid from the second chamber to the first chamber, means for biasing the valve element seated, and manually-controlled means for positively holding the valve element off its seat.

4. In a fluid braking system for a vehicle, the combination with a source of pressure and braking units for the front and rear wheels connected to be actuated thereby, of a combined brake holding valve and shut-off valve for the braking system and comprising a casing connected in the system and provided with a chamber through which fluid must pass to and from all of the braking units and a second chamber communicating with the first chamber and through which fluid must pass to and from the braking units of the front wheels only, gravity-controlled valve means in the first named chamber for preventing return flow of fluid from all of the braking units, a valve seat between the two chambers, a valve element associated with said seat and movable off its seat in the direction of flow of fluid from the second chamber to the first chamber, means for biasing the valve element seated, and manually-controlled means for positively holding the valve element off its seat.

5. In a fluid braking system, the combination with a source of pressure and a braking unit connected to be actuated thereby, of a shut-off valve for the braking system for preventing fluid from flowing only from the source of pressure to the braking unit and comprising a casing connected in the system and through which fluid must pass to and from the braking unit, a valve seat in said casing, a valve element cooperating with the seat and movable off said seat in the direction of flow of fluid from the brake unit to the source of pressure, and means for positively holding said valve element unseated.

6. In a fluid braking system, the combination with a source of pressure and a braking unit connected to be actuated thereby, of a shut-off valve for the braking system for preventing fluid from flowing only from the source of pressure to the braking unit and comprising a casing connected in the system and through which fluid must pass to and from the braking unit, a valve seat in said casing, a valve element cooperating wtih the seat and movable off said seat in the direction of flow of fluid from the brake unit to the source of pressure, a spring for biasing the valve element seated, an element for positively moving the valve element off the seat, and means operable from a remote point for controlling said last named element.

7. In a fluid braking system, the combination with a source of pressure and two braking units connected to be actuated thereby, means forming a chamber associated with the system and through which fluid must pass to and from one of the braking units, valve means in said chamber including a gravity-controlled member for preventing fluid from flowing from said brake unit to the source of pressure, means forming a second chamber associated with the system and through which fluid must pass to and from the other brake unit, check valve means associated with said chamber and preventing fluid from flowing to the said unit but not in the opposite direction, and manually-controlled means operable from a remote point for positively holding said check valve means in open position.

WALTER R. FREEMAN.